United States Patent [19]

Sakaguchi

[11] Patent Number: 4,658,311
[45] Date of Patent: Apr. 14, 1987

[54] MAGNETIC DATA TRANSFER APPARATUS HAVING A DISK DRIVE MECHANISM PROTECTED AGAINST LEAKAGE FLUX

[75] Inventor: Takahiro Sakaguchi, Tokyo, Japan

[73] Assignee: Teac Corporation, Tokyo, Japan

[21] Appl. No.: 719,767

[22] Filed: Apr. 4, 1985

[30] Foreign Application Priority Data

Apr. 9, 1984 [JP] Japan ............................. 59-52484[U]

[51] Int. Cl.⁴ ............................................. G11B 17/02
[52] U.S. Cl. ...................................... 360/97; 369/270
[58] Field of Search ................................... 360/97–99; 369/270

[56] References Cited

U.S. PATENT DOCUMENTS

| | | | |
|---|---|---|---|
| 3,430,966 | 3/1969 | Gregg | 369/270 |
| 4,322,841 | 3/1982 | Borchard et al. | 369/270 |
| 4,445,155 | 4/1984 | Takahashi et al. | 360/99 |
| 4,570,194 | 2/1986 | Schatteman | 360/97 |

Primary Examiner—Robert S. Tupper
Attorney, Agent, or Firm—Woodcock Washburn Kurtz Mackiewicz & Norris

[57] ABSTRACT

A data transfer apparatus for use with a magnetic disk having a hub of magnetic material attached centrally thereto, with the hub having a central hole and an eccentric slot defined therein. A drive mechanism for imparting rotation to the magnetic disk includes a turntable having a spindle projecting therefrom for centering engagement in the central hole in the hub of the magnetic disk placed thereon, and a drive pin mounted eccentrically on the turntable for driving engagement in the eccentric slot in the disk hub. Also mounted on the turntable is a permanent magnet of approximately annular shape for attracting the disk hub. The magnet has both north and south poles on its surface opposite the hub of the magnetic disk on the turntable, so that a closed magnetic circuit is formed for the reduction of leakage flux that might adversely affect the data transfer of the apparatus with the magnetic disk. Instead of the single magnet, there can be provided two concentric magnets, or several pairs of adjoining magnets of annular arrangement, having both magnetic poles oriented opposite the disk hub.

3 Claims, 7 Drawing Figures

MAGNETIC DATA TRANSFER APPARATUS HAVING A DISK DRIVE MECHANISM PROTECTED AGAINST LEAKAGE FLUX

BACKGROUND OF THE INVENTION

This invention relates to an apparatus for data transfer with interchangeable magnetic disks, particularly those of the class commonly referred to as "microfloppy disks," having a hub of magnetic material attached centrally thereto, as disclosed in Takahashi et al. U.S. Pat. No. 4,445,155 assigned to Sony Corp., of Tokyo, Japan. Still more particularly, the invention concerns a disk drive mechanism in such a data transfer apparatus for imparting rotation to the magnetic disk.

The prior art disk drive mechanism (shown in FIG. 1 of the drawings attached hereto) for use with magnetic disks of the type in question has a turntable of approximately the same size as the central hub of the magnetic disk to be mounted thereon. The turntable is mounted on a spindle which in fact may be the output shaft of an electric disk drive motor. Partly projecting from the turntable, the spindle is engageable in a central hole in the hub of the magnetic disk when the latter is coaxially placed upon the turntable. A spring biased, retractable drive pin is mounted eccentrically on the turntable for engagement in a slot defined eccentrically in the disk hub for transmitting the rotation of the turntable to the magnetic disk. Also mounted on the turntable is a permanent magnet for attracting the hub of ferromagnetic material at the center of the disk.

A problem has existed in connection with the permanent magnet of the prior art disk drive mechanism of the above construction. As the turntable is also of magnetic material, the magnet creates closed magnetic circuits in combination with the turntable and the hub of the magnetic disk on the turntable. The conventional construction of the disk drive mechanism has been such, however, that the magnetic lines of force due to the permanent magnet have been easy to partly leak through the gap between turntable and disk drive, as will be later explained in more detail. Such leakage flux is objectionable because it can adversely affect the process of data transfer between the magnetic disk and a transducer head or heads disposed on on one or both sides of the disk.

SUMMARY OF THE INVENTION

The present invention aims, in the disk drive mechanism of a data transfer apparatus of the type defined, at the reduction of the noted leakage flux to such an extent that data transfer between magnetic disk and transducer head or heads is totally unaffected thereby.

According to the present invention, summarized briefly, there is provided a data transfer apparatus for use with a magnetic disk of the class specified, including a disk drive mechanism for imparting rotation to the magnetic disk. The disk drive mechanism particularly features permanent magnet means of approximately annular configuration fixedly and concentrically mounted on a turntable for attracting the hub of the magnetic disk. The permanent magnet means has north and south poles disposed adjacent each other and both held opposite the hub of the magnetic disk placed on the turntable.

The permanent magnet means can take the form of either a single magnet of substantially annular shape or two such magnets arranged concentrically, one radially inwardly of the other. As an additional alternative, several pairs of adjoining magnets may be disposed at constant angular spacings about the axis of the turntable.

As the north and south poles of the permanent magnet means are disposed adjacent each other and both held opposite the hub of the magnetic disk on the turntable in accordance with the invention, the magnetic lines of force from the north pole or poles pass the disk hub and substantially wholly reach the south pole or poles to form a closed magnetic circuit or circuits. No significant leakage of the flux is therefore to take place that might interfere with the magnetic writing or reading of data on or from the magnetic disk.

The above and other features and advantages of this invention and the manner of realizing them will become more apparent, and the invention itself will best be understood, from a study of the following description and appended claims, with reference had to the attached drawings showing both the prior art and some preferable embodiments of the invention.

DETAILED DESCRIPTION

Figure 1:
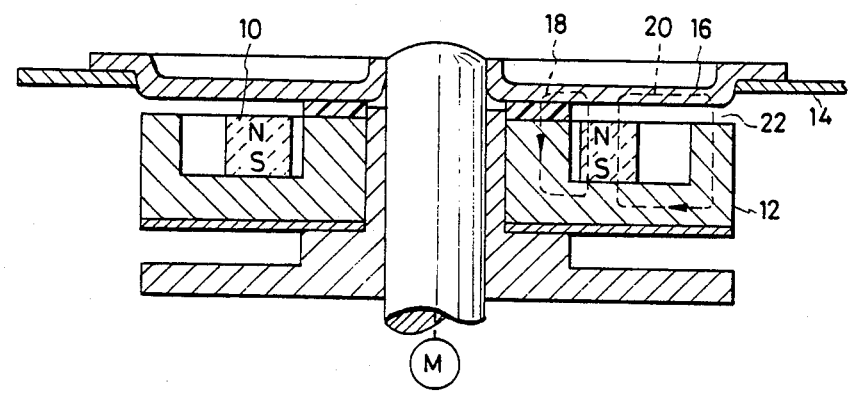
FIG. 1 is a partial axial section through the prior art disk drive mechanism, shown together with a magnetic disk mounted in place thereon.

In the prior art disk drive mechanism of FIG. 1, a permanent magnet 10 of substantially annular shape is mounted concentrically on a turntable 12, on which there is also shown mounted a replaceable magnetic disk 14 having a hub 16 of magnetic material. The permanent magnet 10 has a north pole N on its surface oriented toward the disk hub 16, and a south pole S on its opposite surface directed away from the disk hub. As the turntable 12 is also of magnetic material, two magnetic circuits are created as indicated by the dashed lines designated 18 and 20. Some of the magnetic lines of force forming the outer magnetic circuit 20 inevitably leak through the gap 22 between the opposed peripheries of the turntable 12 and disk hub 16, to the possible impairment of data transfer between a magnetic transducer head or heads, not shown, and the magnetic disk. Such leakage might take place, though perhaps to a lesser extent, even if the gap 22 were closed. The present invention provides an improved disk drive mechanism free from this drawback of the prior art.

The disk drive mechanism in accordance with the invention is particularly well suited for use with the flexible magnetic disk cassette of the kind disclosed in the noted U.S. Pat. No. 4,445,155. The construction of the representative disk cassette, illustrated in FIGS. 2 and 3 and therein generally designated 24, will be explained to an extent necessary for a full understanding of the invention.

The exemplified disk cassette 24 includes a flexible magnetic disk 26 with a diameter of, typically, 86 millimeters. The magnetic disk 26 is housed in a protective envelope 28 of relatively rigid plastics material. The envelope 28 is of generally flat, approximately square boxlike shape, comprising a pair of opposite main sides 30 and 32 oriented parallel to the magnetic disk 26. The disk cassette 24 is to be loaded horizontally in the associated data transfer apparatus, to be disclosed presently, with its side 30 directed upwardly and, as indicated by the arrow in FIG. 2, with its edge 34 foremost. The side 30 of the disk envelope 28 will therefore be hereinafter referred to as the top side, the other side 32 as the bottom side, and the edge 34 as the front edge.

Figure 2:
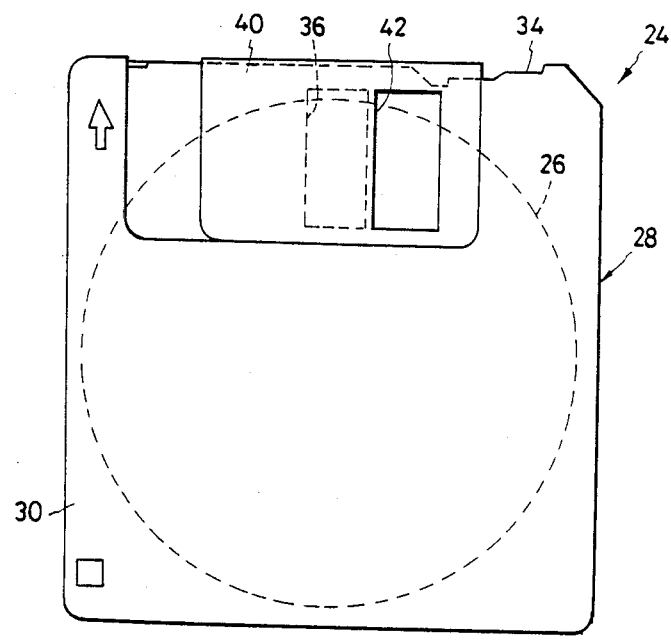
FIG. 2 is a top plan view of a magnetic disk cassette suitable for use with the data transfer apparatus in accordance with the invention.
Figure 3:
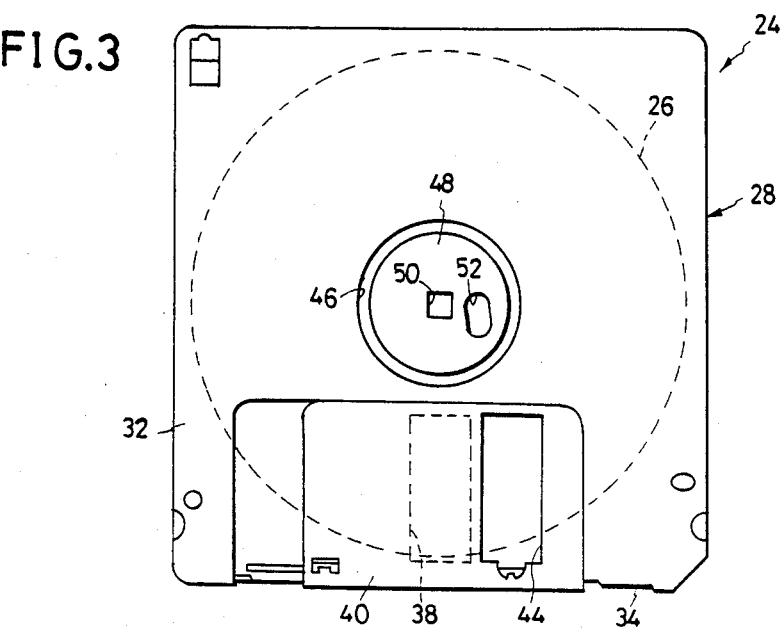
FIG. 3 is a bottom plan view of the magnetic disk cassette of FIG. 2.

Formed in both top 30 and bottom 32 sides of the envelope 28, in the vicinity of its front edge 34, are apertures 36 and 38 to expose radial portions of the opposite surfaces of the magnetic disk 26 for data transfer contact with a transducer head or a pair of such heads of the data transfer apparatus. Normally, the apertures 36 and 38 are held closed by a sliding shutter 40 in the form of a sheet of aluminum, stainless steel or like material bent into the shape of a U to fit over the front edge 34 of the envelope 28. The shutter 40 has itself two apertures 42 and 44 defined therein. These shutter apertures 42 and 44 are out of register with the envelope apertures 36 and 38 when the shutter 40 is in the normal or right hand position of FIGS. 2 and 3 under the bias of a spring (not shown). When the disk cassette 24 is loaded fully into the data transfer apparatus, the shutter 40 will be forced leftwardly, as seen in FIGS. 2 and 3, by a shutter opening lever included in the apparatus against the bias of the unshown spring. Thereupon the shutter 40 will bring its apertures 42 and 44 into register with the envelope apertures 36 and 38, respectively, thereby exposing the radial portions of the opposite faces of the magnetic disk 26 for data transfer contact with the transducer head or heads of the data transfer apparatus.

The magnetic disk cassette 24 is to be loaded upon the disk drive mechanism of the data transfer apparatus with the top side 30 of its envelope 28 oriented upwardly. Thus, as seen in FIG. 3, the bottom side 32 of the envelope 28 has a circular opening 46 defined centrally therein to allow engagement of the magnetic disk 26 with the turntable. Exposed through the central opening 46 is a hub 48 in the form of a disk of ferromagnetic material attached centrally to the magnetic disk 26. The hub 48 has a first opening such as a square hole 50 defined centrally therein, and a second opening such as a short slot 52 defined eccentrically therein.

Figure 4:
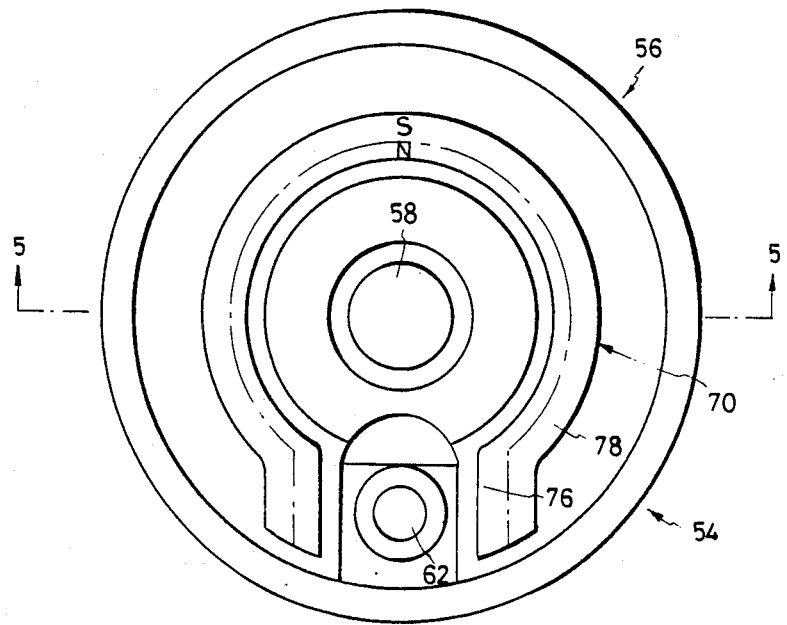
FIG. 4 is a top plan view of the disk drive mechanism of a data transfer apparatus constructed in accordance with the novel concepts of this invention, for use with the disk cassette of FIGS. 2 and 3.
Figure 5:
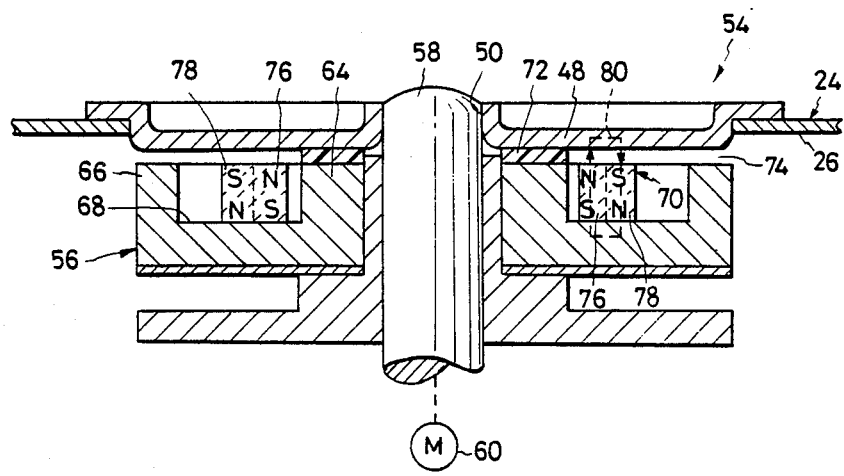
FIG. 5 is an axial section through the disk drive mechanism of FIG. 4, taken along the line 5—5 therein and shown together with the disk cassette of FIGS. 2 and 3 mounted in place thereon.

Illustrated in FIGS. 4 and 5 and generally designated 54 is a preferred form of the disk drive mechanism constructed in accordance with the invention as adapted for a data transfer apparatus for use with the flexible magnetic disk cassette 24 of FIGS. 2 and 3. The disk drive mechanism 54 is herein shown only to an extent necessary for a full understanding of the features and advantages of this invention. Reference may be had to U.S. patent application Ser. No. 676,005 filed Nov. 30, 1984, and assigned to the assignee of the instant application, for details other than those disclosed herein in the construction and operation of this type of disk drive mechanism.

The disk drive mechanism 54 includes a turntable 56 of magnetic material and of approximately the same size as the hub 48 of the magnetic disk 26 for holding the magnetic disk cassette 24 thereon. The turntable 56 is fixedly and concentrically mounted on an upstanding spindle 58 for joint rotation therewith. The spindle 58 may be the output shaft of a disk drive motor shown as a schematic symbol and labeled 60. The spindle 58 partly projects upwardly of the turntable 56 for engagement in the center hole 50 in the hub 48 of the magnetic disk 26 on the turntable 56, in order that the magnetic disk may lie centered on the turntable.

A retractable drive pin 62 is mounted eccentrically on the turntable 56 via a spring, not shown, for engagement in the eccentric slot 52 in the hub 48 of the magnetic disk 26. When the disk cassette 24 is loaded coaxially on the turntable 56, the spindle 58 will become engaged in the center hole 50 in the disk hub 48, but the drive pin 62 will in all likelihood be out of register with the eccentric slot 52 in the disk hub. The disk hub 48 will then depress the drive pin 62 into the turntable 56 against the force of the unshown spring. As the turntable 56 is subseequntly set into rotation by the disk drive motor 60, the drive pin 62 will come into register with the eccentric slot 52 in the disk hub 48, whereupon the drive pin will be sprung into engagement in the eccentric slot. Thus engaged in the eccentric slot 52, the drive pin 62 will function to transmit the rotation of the turntable 56 to the disk hub 48, causing the rotation of the magnetic disk 26 within the envelope 28.

The turntable 56 has an inner rim 64 and an outer rim 66 formed integral therewith, with a relatively depressed part 68 between the two rims. A permanent magnet 70 of approximately annular or horseshoe shape is immovably and concentrically mounted on the turntable 56 so as to be accommodated in the relatively depressed part 68 thereon. A disk seat 72 in the form of a flat ring of polyacetal resin or like material is conventionally mounted on the inner rim 64 of the turntable 56 for direct contact with the hub 48 of the magnetic disk 26 placed thereon, creating a gap 74 between the disk hub and the outer rim 66 of the turntable. The disk seat 72 is intended for the establishment of proper contact between disk hub 48 and turntable 56 as well as for the adjustment of the attractive force exerted by the permanent magnet 70 on the disk hub.

Although identical in shape and size with the prior art permanent magnet 10 of FIG. 1, the improved permanent magnet 70 of this invention differs therefrom in the arrangement of the magnetic poles. The magnet 70 is shown to be magnetized with a north pole N on a radially inward portion 76 of its top surface, to be held opposite the hub 48 of the magnetic disk 26 when the latter is placed on the turntable 56, and with a south pole S on a radially outward portion 78 of the top surface. The bottom surface of the magnet 70 is magnetized with a south pole S on its radially inward portion and with a north pole on its radially outward portion.

Thus, when the magnetic disk cassette 24 is loaded on the turntable 56, with the spindle 58 and drive pin 64 engaged respectively in the center hole 50 and eccentric slot 52 in the disk hub 48 seated on the disk seat 72, the permanent magnet 70 creates a closed magnetic circuit, as depicted by the dashed lines designated 80, with the disk hub 48 and turntable 56. The leakage of the magnetic lines of force through the gap 74 between disk hub 48 and outer turntable rim 66 can thus be drastically reduced for the prevention of such leakage flux from adversely affecting the writing or reading of data on or from the magnetic disk 26.

Figure 6:
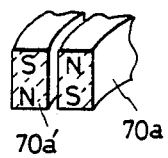
FIG. 6 is a fragmentary perspective view of an alternative form of the permanent magnet means for use in the disk drive mechanism of FIGS. 4 and 5.

The permanent magnet 70 of FIGS. 4 and 5 represents but one of numerous magnet constructions in accordance with the invention. Thus, in FIG. 6, two permanent magnets 70a and 70a' of approximately the same shape as the magnet 70 are arranged concentrically, one radially inwardly of the other, on the turntable in substitution for the magnet 70. The inner magnet 70a is shown to be magnetized with a north pole N on its surface held opposite the hub of the magnetic disk placed on the turntable, and the outer magnet 70a' with a south pole S on its surface held opposite the disk hub on the turntable.

Figure 7:
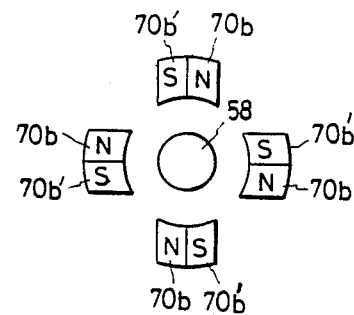
FIG. 7 is a top plan view diagrammatically illustrating another alternative form of the permanent magnet means for use in the disk drive mechanism of FIGS. 4 and 5.

FIG. 7 shows still another embodiment wherein four pairs of adjoining permanent magnets 70b and 70b' are arranged at constant angular spacings about the axis of the turntable or of the spindle 58. Each magnet 70b is shown to be magnetized with a north pole N on its surface held opposite the hub of the magnetic disk placed on the turntable, and each magnet 70b' with a south pole S on its surface held opposite the disk hub on the turntable.

It is to be understood that the foregoing disclosed embodiments of this invention are meant purely to illustrate or explain and not to impose limitations upon the invention, as a variety of modifications of the invention will readily occur to one skilled in the art on the basis of this disclosure. For example, the permanent magnet or magnets to be mounted on the turntable may take various forms other than those disclosed herein, all that is required being that their magnetic poles be so arranged as to minimize leakage flux. Another possible modification of the illustrated disk drive mechanism is to bring the outer rim 66 of the turntable 56 more or less into contact with the hub 48 of the magnetic disk 26 loaded thereon, thereby closing the gap 74 therebetween, although the closure of this gap is unessential for the reduction of the leakage flux to a required degree.

What is claimed is:

1. A data transfer apparatus for use with a magnetic disk of the type having a hub of magnetic material attached centrally thereto, the hub having a first opening defined centrally therein and a second opening defined eccentrically therein, the apparatus including a disk drive mechanism for imparting rotation to the magnetic disk, comprising:
   (a) a spindle
   (b) a turntable fixedly and coaxially mounted on the spindle for joint rotation therewith, the spindle partly projecting from the turntable for centering engagement in the first opening in the hub of the magnetic disk as the latter is placed on the turntable;
   (c) a drive pin mounted eccentrically on the turntable for driving engagement in the second opening in the hub of the magnetic disk placed on the turntable; and
   (d) permanent magnet means of substantially annular arrangement fixedly and concentrically mounted on the turntable, the permanent magnet means having north and south poles disposed adjacent each other in a radial direction of the turntable and both oriented opposite the hub of the magnetic disk and so reducing leakage flux.

2. A data transfer apparatus as set forth in claim 1, wherein the permanent magnet means comprises a permanent magnet of substantially annular shape having either of the north and south poles disposed on a radially inward portion of its surface held opposite the hub of the magnetic disk placed on the turntable, the other of the north and south poles of the permanent magnet being disposed on a radially outward portion of its surface held opposite the hub of the magnetic disk on the turntable.

3. A data transfer apparatus as set forth in claim 1, wherein the permanent magnet means comprises two permanent magnets of substantially annular shape arranged one concentrically inwardly of the other, one of the permanent magnets having either of the north and south poles disposed on its surface held opposite the hub of the magnetic disk placed on the turntable, the other permanent magnet having the other of the north and south poles disposed on its surface held opposite the hub of the magnetic disk on the turntable.

* * * * *